(No Model.) 2 Sheets—Sheet 1.

J. C. SCHUMAN.
MANUFACTURE OF STARCH.

No. 334,090. Patented Jan. 12, 1886.

Witnesses: Chas. J. Buchheit, Theo. L. Popp.

Inventor: J. C. Schuman
By Wilhelm Bonner
Attorneys.

(No Model.) 2 Sheets—Sheet 2.

J. C. SCHUMAN.
MANUFACTURE OF STARCH.

No. 334,090. Patented Jan. 12, 1886.

Witnesses:
Chas. J. Buchheit
Theo. L. Popp

J. C. Schuman, Inventor.
By Wilhelm Bonner
Attorneys.

UNITED STATES PATENT OFFICE.

JOHN C. SCHUMAN, OF AKRON, ASSIGNOR TO WILLIAM T. JEBB, OF BUFFALO, NEW YORK.

MANUFACTURE OF STARCH.

SPECIFICATION forming part of Letters Patent No. 334,090, dated January 12, 1886.

Application filed November 23, 1885. Serial No. 183,706. (No model.)

*To all whom it may concern:*

Be it known that I, JOHN C. SCHUMAN, of Akron, in the county of Erie and State of New York, have invented new and useful Improvements in the Manufacture of Starch, &c., of which the following is a specification.

This invention relates to an improvement in that method of extracting starch from Indian corn or maize, which consists, essentially, in first steeping the corn until the kernels have become softened, then reducing the corn in such manner that the starch is reduced to a fine meal, while the hulls and germs are detached in large fragments from the starchy portions of the kernels, and then separating the starch-meal from the hulls and germs by sifting. In practicing this method heretofore the corn was partially dried after steeping by permitting the water to drain thoroughly from the corn through a perforated false bottom in the steep-tank. This operation consumed several hours without, however, leaving the corn in as dry a state as was desirable, in order to obtain the best results in the subsequent steps of reducing and sifting.

The object of the present invention is to prepare the steeped corn for reduction in less time than heretofore and in a more satisfactory manner; and my invention consists to that end, principally, in drying the steeped corn by forcing air through the same after the water has been drawn off, as will be hereinafter fully set forth, and pointed out in the claims.

Figure 1:
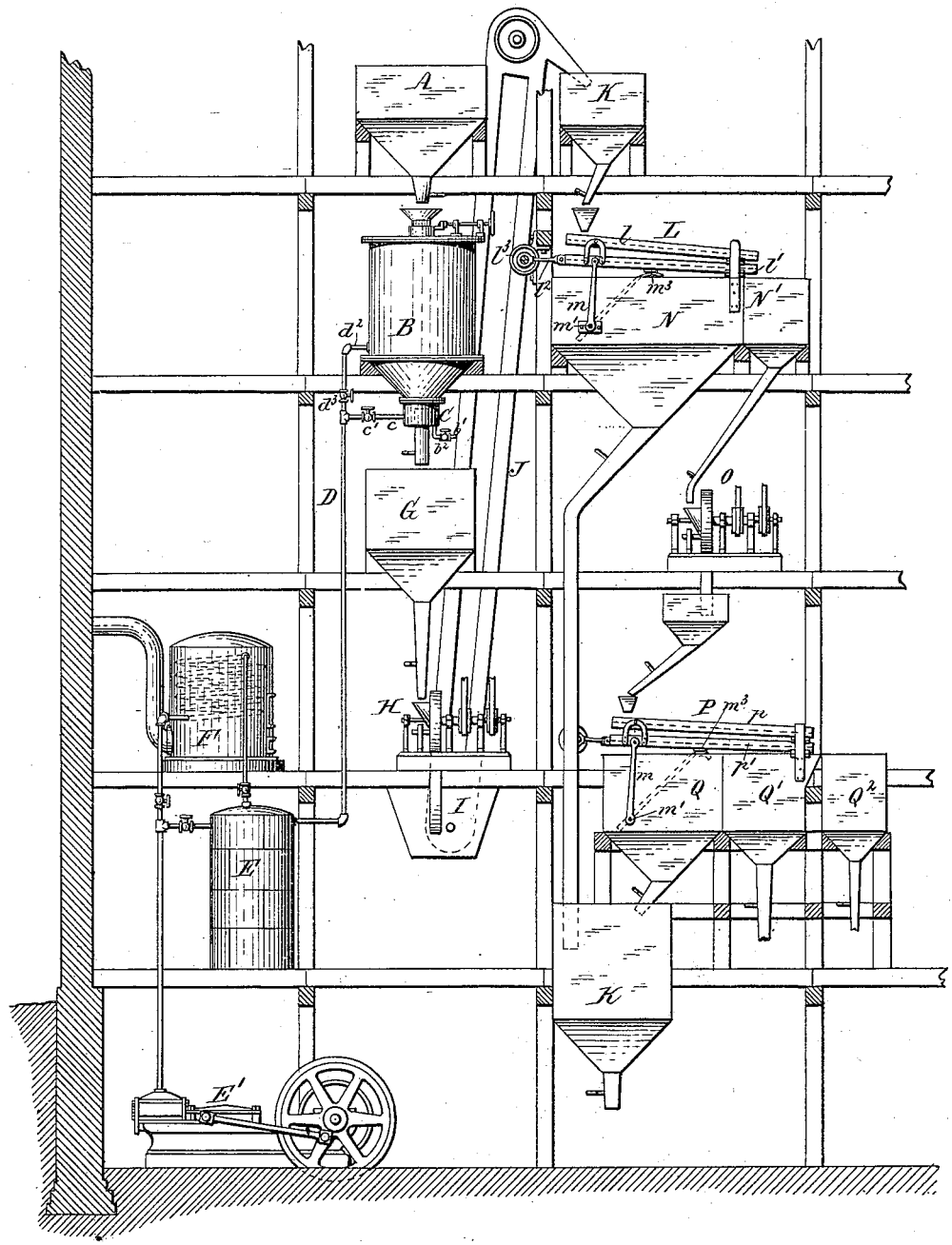
Figure 2:
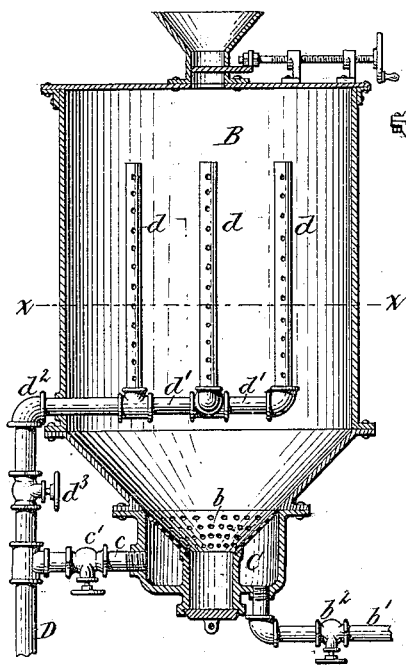
Figure 4:
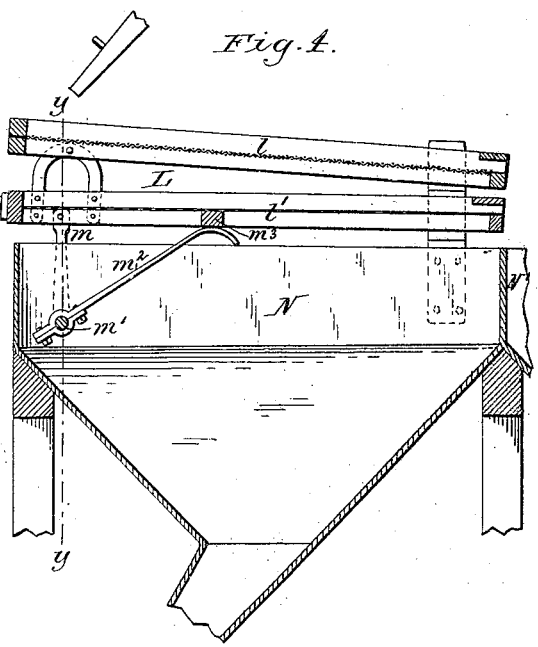
Figure 3:
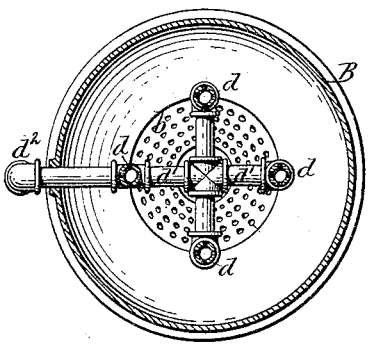
Figure 5:
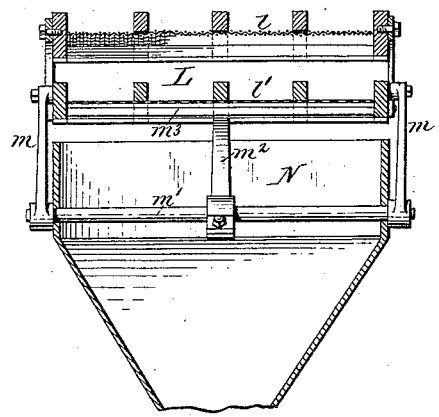

In the accompanying drawings, consisting of two sheets, Figure 1 is a sectional elevation of a plant of machinery by which my invention can be practiced. Fig. 2 is a vertical section of the steep-tank. Fig. 3 is a horizontal section in line $x\ x$, Fig. 2. Fig. 4 is a vertical longitudinal section of one of the separators. Fig. 5 is a vertical cross-section in line $y\ y$, Fig. 4.

Like letters of reference refer to like parts in the several figures.

A represents the store bin or receptacle, in which the Indian corn is contained.

B represents the steep-tank, which may be constructed of iron, wood, or other suitable material, and which receives the corn from the bin A. The tank B is provided with a perforated false bottom, $b$, through which the steep-water is drawn off through a pipe, $b'$, provided with a cock, $b^2$.

$c$ represents an air-pipe, which enters the chamber C underneath the false bottom $b$, and which is provided with a suitable cock, $c'$.

$d$ represents vertical perforated air-pipes arranged in the body of the steep-tank B, and connected at their lower ends by branch pipes $d'$ with an air-pipe, $d^2$, which is provided with a cock, $d^3$. Both air-pipes $c$ and $d^2$ are connected with a common supply-pipe, D, which receives the air from the receiver E.

E' represents an air-compressor of any suitable construction, whereby air is forced into the receiver E and through the supply-pipe D into the chamber C and perforated pipes $d$. When a considerable air-pressure is desired in the receiver E, I prefer to employ a cylinder-compressor having a reciprocating piston; but when a low pressure is sufficient to accomplish the desired purpose a rotary compressor may be employed.

F represents a heating-coil, in which the air may be heated, if desired, before entering the receiver E.

G represents a tank or bin, which receives the steeped corn from the tank B.

H represents a reducing-machine, which receives the corn from the tank G, and in which the corn is reduced in such manner that the hulls and germs are detached in large fragments from the starchy portions of the kernels, while the starchy portions are reduced to a fine meal, so that the fragments of hulls and germs can be separated from the starch-meal and from each other by sifting as the fragments of hulls are much larger than the fragments of germs. The reducing-machine preferably employed for this purpose is provided with several concentric rows of beaters revolving at a high speed in opposite directions within an inclosing-case. If preferred, however, a disk-mill, roller-mill, or any other suitable reduction-machine may be employed.

I represents a receptacle, which receives the reduced corn from the reduction-machine, and J is an elevator, whereby the reduced material is elevated to a receiver, K.

L represents a screen-separator, which effects a separation of the starch-meal from the fragments of hulls and germs. This separator consists of an upper shaking-screen, $l$, and a lower shaking-screen, $l'$, both secured together so as to be simultaneously vibrated by a connecting-rod, $l^2$, and eccentric $l^3$, or other suitable means. The upper screen, $l$, has a greater pitch than the lower screen, $l'$, and is covered with a coarse wire-cloth, which permits the starch-meal and fragments of germs to pass through upon the fine screen $l'$, while the hulls tail off. The lower screen, $l'$, is clothed with a cloth of the proper mesh to permit only the starch to pass through while the fragments of germs tail off. The coarse upper screen, $l$, immediately removes the hulls from the starch, thereby relieving the lower screen materially, and also acts as a disintegrator in breaking up aggregations of fragments and liberating the starch contained therein, so that it can pass through the upper screen. This compound screen is supported at its head end by rock-arms $m$, so as to receive an oscillatory motion, and at its tail end by slides, so as to receive a reciprocating or sliding motion in a well-known manner. The rock-arms $m$ are attached to a horizontal rock-shaft, $m'$, which carries also a knocker-arm, $m^2$. The latter is moved up and down by the oscillations of the rock-shaft and strikes against a cross-piece, $m^3$, on the frame of the lower screen, $l'$, thereby jarring the screens and keeping their meshes open.

N represents a receiver, in which the starch-meal is collected which passes through the lower screen, $l'$, and N' is a receiver which collects the hulls and germs which tail off from both screens.

O represents a second reduction-machine, which is similar in construction to the first-described reduction-machine, and in which the hulls and germs collected in the receptacle N' are subjected to a second reducing operation for the purpose of detaching any starch particles which may still adhere to the fragments of hulls and germs. The product of this reduction is separated by a second compound screen, P, which is composed of an upper coarse screen, $p$, and a lower fine screen, $p'$. The upper screen, $p$, is so clothed that only the coarse fragments of hulls tail off, while all of the finer material passes through the screen $p$ upon the screen $p'$ below. The latter has its head portion clothed with a fine cloth which permits only the starch to pass through, and its tail portion covered with a coarser cloth which permits the fragments of germs to pass through, while the fragments of hulls tail off. The starch is collected in a receiver, Q, the germs in a receiver, Q', and the hulls in a receiver, Q². The starch is conveyed from both receivers N and Q into a receiver, R, from which it is removed and further treated, as may be necessary for producing the desired product. For instance, it may be dried and be sold to the trade in this condition, or it may be worked into laundry or culinary starch, grape-sugar or glucose, distilled or fermented liquors, &c. The corn placed in the steep-tank B is steeped in warm water, preferably of a temperature of about 150° Fahrenheit, for a suitable length of time, a period of fifteen hours being generally sufficient to properly soften the corn; but this period may be lengthened or shortened, in accordance with the condition of the corn and the state of the weather. The temperature is preferably maintained in the steep-tank by renewing the water from time to time. When the corn has been properly steeped, the water is drawn off through the perforated bottom and the pipe $b'$. When this has been accomplished, the cock $b^2$ is closed and air is admitted to the steep-tank through the pipe D. The air enters the tank through the perforated bottom $b$ and the perforated pipes $d$, and passes through the wet corn in the tank and escapes through the opening in the top of the tank. In passing through the corn the air dries the same and removes the warm vapor which fills the interstices between the kernels, thereby cooling the corn and toughening the hulls. The air which is so forced through the wet corn thoroughly permeates the entire mass of corn and removes the moisture from the outer portions of the kernels in a very short time, leaving them in a comparatively dry state. By drying the corn in this manner numerous important advantages are obtained. The period during which the corn remains moist is shortened by several hours, thereby reducing the liability of the product to ferment or turn sour. The corn is more easily discharged from the steep-tank and more easily passed through the conduits which lead to the reduction-machine. The starch, hulls, and germs are not so liable to adhere to the parts of the reduction-machine and the conveyers and elevator-buckets, as these products are much drier than heretofore. The starchy portions of the kernels being drier, they are reduced to a higher degree of fineness with a smaller expenditure of power and pass more easily through the separating-screens, thereby permitting the use of finer screens, which effect a more complete separation of the starch from the offal. The hulls and germs are more completely freed from adhering starchy particles, thereby increasing the yield of starch.

I claim as my invention—

1. The herein-described method of preparing the grain for reduction, which consists in first steeping the grain, then drawing off the water, and then drying the grain by an air-current, substantially as set forth.

2. The herein-described method of preparing the grain for reduction, which consists in first steeping the grain, then drawing off the water, and then drying the grain by forcing compressed air through the same, substantially as set forth.

3. The herein-described method of extracting starch from grain, which consists in first steeping the grain, then drawing off the water, then drying the grain by an air-current, then reducing the grain, and then separating the starch from the offal, substantially as set forth.

4. The herein-described method of extracting starch from grain, which consists in first steeping the grain, then drawing off the water, then drying the grain by forcing compressed air through the same, then reducing the grain, and then separating the starch from the offal, substantially as set forth.

Witness my hand this 16th day of November, 1885.

J. C. SCHUMAN.

Witnesses:
B. D. HENDERSON,
A. RICHARDSON.